(12) United States Patent
Brainin

(10) Patent No.: US 11,095,746 B2
(45) Date of Patent: Aug. 17, 2021

(54) METHOD FOR CONFIGURING AN INTERNET SERVICE PROVIDER

(71) Applicant: TICO TELECOMMUNICATION INNOVATION GMBH, Vienna (AT)

(72) Inventor: David Brainin, Vienna (AT)

(73) Assignee: TICO Telecommunication Innovation GmbH, Vienna (AT)

( * ) Notice: Subject to any disclaimer, the term of this patent is extended or adjusted under 35 U.S.C. 154(b) by 28 days.

(21) Appl. No.: 16/343,474

(22) PCT Filed: Oct. 19, 2016

(86) PCT No.: PCT/AT2016/060083
§ 371 (c)(1),
(2) Date: Apr. 19, 2019

(87) PCT Pub. No.: WO2018/071925
PCT Pub. Date: Apr. 26, 2018

(65) Prior Publication Data
US 2019/0268438 A1    Aug. 29, 2019

(51) Int. Cl.
| | |
|---|---|
| *G06F 15/16* | (2006.01) |
| *H04L 29/08* | (2006.01) |
| *G06F 16/23* | (2019.01) |
| *H04L 29/06* | (2006.01) |
| *H04W 4/20* | (2018.01) |
| *H04W 12/08* | (2021.01) |
| *G06F 21/31* | (2013.01) |
| *G06Q 20/14* | (2012.01) |
| *H04W 8/18* | (2009.01) |

(52) U.S. Cl.
CPC ........ *H04L 67/306* (2013.01); *G06F 16/2379* (2019.01); *G06F 21/31* (2013.01); *H04L 63/0876* (2013.01); *H04L 63/102* (2013.01); *H04L 67/02* (2013.01); *H04W 4/20* (2013.01); *H04W 12/08* (2013.01); *G06Q 20/14* (2013.01); *H04W 8/183* (2013.01)

(58) Field of Classification Search
CPC ..... H04L 63/08; H04L 63/0876; H04L 63/10; H04L 63/102; H04L 67/306
USPC .................................................. 709/217, 218
See application file for complete search history.

(56) References Cited

U.S. PATENT DOCUMENTS

2005/0228874 A1* 10/2005 Edgett ................... H04L 63/08
                                                            709/220
2006/0129831 A1*  6/2006 Andreev ............ H04L 63/0876
                                                            713/183

* cited by examiner

*Primary Examiner* — Wing F Chan
*Assistant Examiner* — Andrew Woo
(74) *Attorney, Agent, or Firm* — Laurence A. Greenberg; Werner H. Stemer; Ralph E. Locher

(57) ABSTRACT

A method for configuring an Internet service provider includes assigning an identification server to the Internet service provider, transmitting a request from a user to a server, transmitting a response containing a program logic and a program sequence to the user, in which a terminal allows the program sequence to be initiated according to the program logic, and executing the program sequence after the initiation step, in which the program sequence prompts the terminal to transmit a configuration message to the configuration server. After arrival of the configuration message, the configuration server determines the identity assigned to the user. A configuration database of the Internet service provider is modified on the basis of the determined identity in such a way that the Internet service provider processes data relating to the user according to different criteria from then on.

29 Claims, 2 Drawing Sheets

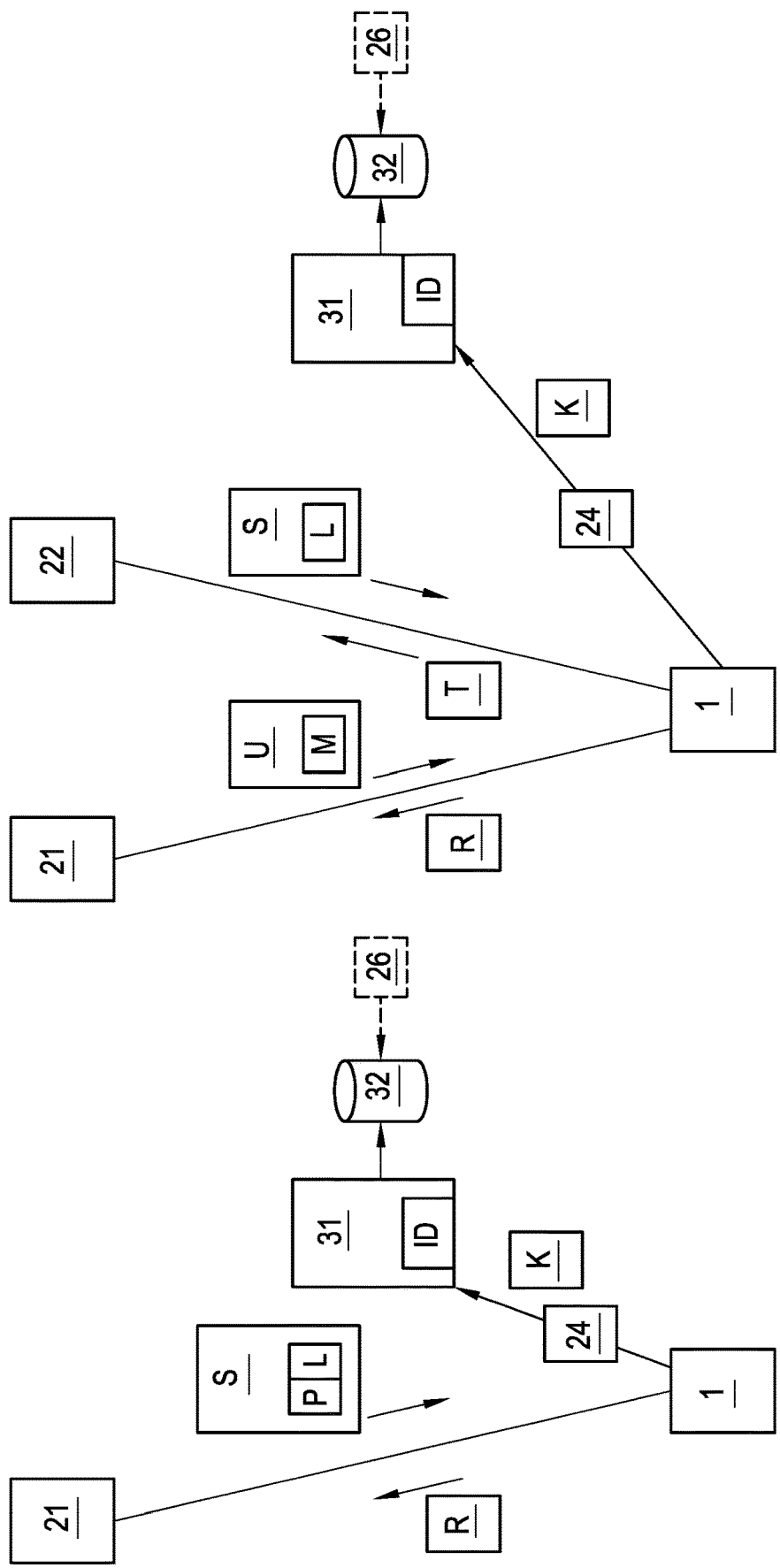

METHOD FOR CONFIGURING AN INTERNET SERVICE PROVIDER

BACKGROUND OF THE INVENTION

FIELD OF THE INVENTION

The invention relates to a method and an arrangement for configuring the behavior of an internet service provider during the communication of a terminal with the internet.

In particular, the invention relates to a method for configuring an internet service provider, wherein
a) the internet service provider is assigned an identification server,
b) a request is communicated from the user to a server,
c) a response is communicated to the user, said response containing a program logic and also a program sequence,
d) the terminal, in accordance with the program logic, makes possible the initiation of the program sequence,
e) the program sequence is executed after the initiation in step d), wherein the program sequence causes the terminal to communicate a configuration message to the configuration server,
f) after this configuration message arrives, the configuration server determines the identity assigned to the user, and
g) a configuration database of the internet service provider is modified on the basis of the ascertained identity in such a way that the internet service provider from then on processes data relating to the user according to different criteria.

In methods for configuring the behavior of an internet service provider that are known from the prior art it is often necessary for the user to visit the site of the internet service provider. This is not preset in this way in most web servers, however, and so certain users do not implement advantageous releases and configurations in many cases.

SUMMARY OF THE INVENTION

It is an object of the invention, therefore, to be able to carry out a configuration of the behavior of internet service providers from virtually any servers if the relevant internet service provider permits such a configuration to be carried out.

A preferred object of the invention is a configuration in which, after a user's consent has been obtained, the processing of the data relating to said user is modified. The prior art discloses various applications that require the users' explicit consent before certain services can be provided. Most known methods for generating or for revoking such consent satisfy the legal data protection requirements only to an insufficient extent. This problem is very pronounced in Europe, in particular, where the directives 94/46/EC and the General Data Protection Regulation 2018 stipulate a strict set of regulations.

In this respect, it is a preferred object of the invention to make it possible to obtain users' consents in an automated manner, in particular on third-party sites, and at the same time also to afford the possibility of satisfying the strict legal requirements in respect of transparency and voluntariness. This possibility can be made available, in principle, both to internet service providers and to third-party providers.

However, outside the field of data protection requiring comprehensible consents on the part of the user, there are also numerous further applications for the remote configuration of an internet service provider or of a further server, particularly in the fields of payment, billing, accounting of electronic supplementary services, electronic contract modifications, user authentication, and security.

The invention achieves this object in the case of a method of the type mentioned in the introduction by means of the following steps. In this case, provision is made for the following:
a) wherein the internet service provider makes available to the user an access to the internet via a network, wherein the internet service provider is assigned an identification server, which, for a user, in particular an access made available to the user and/or a terminal assigned to the user, keeps available data for identifying the identity of the user, wherein the configuration is carried out by means of the following steps wherein
b) a request is communicated from the user to a server,
c) a response is communicated to the user, said response containing a program logic interpretable by the terminal of the user and also an executable program sequence,
d) the terminal, upon receiving the response, in accordance with the program logic, makes possible the performance of a user interaction for controlling or suppressing the initiation of the program sequence,
e) the program sequence contained in the program logic is executed after the initiation in step d), wherein the program sequence causes the terminal to communicate, if necessary indirectly, a configuration message to the configuration server of the internet service provider,
f) after said configuration message has arrived, the configuration server determines or ascertains the identity assigned to the user, and
g) a configuration database of the internet service provider or of a further server cooperating with the internet service provider is modified on the basis of the ascertained identity in accordance with the program sequence in such a way that the internet service provider or the further server subsequently processes data relating to the user according to different criteria in accordance with the modified configuration database.

Particularly advantageously, with this procedure it is possible to carry out a configuration from any server on which a software package made available by a third party or else by the internet service provider is installed.

The invention enables the assignment of an interaction of an end user to a customer database by the internet service provider for the purpose of future automated behavior of servers. In particular, the intention is to create a technical sequence for a volitional act—in compliance with data protection and consumer protection laws—for the configuration of future modes of operation of servers.

Particularly advantageous configurations can be carried out by virtue of the fact that the configurations stored in the configuration database for the user in accordance with the latter's identity defines
  how or according to what criteria further requests of the relevant user are processed via the network of the internet service provider, and/or
  in what way notifications or bills are delivered to the user, in particular in the form of letters or emails, and/or
  whether data relating to the user are stored and/or are kept available to a logging server for retrieval.

One advantageous implementation of a configuration database of the internet service provider provides that during the modification of the configuration database in step g)
  data sets having the identity of the user or terminal are modified, erased or marked, or a further feature is added to or linked with the identity of the terminal or of the user that is kept available in the configuration database.

One advantageous procedure for the user-controlled initiation of the configuration provides that in step d) the terminal, upon receiving the response, in accordance with the program logic, makes possible the performance of a user interaction, in particular indicates an actuation field, and wherein in step e) the user interaction is performed, in particular the actuation field is actuated, and a program sequence contained in the program logic is thereupon executed, which causes the terminal to communicate, if necessary indirectly, the configuration message to the identification server.

One simple variant of the invention, in which the address of the configuration server can be configured at the server, provides that in step b) a request is communicated from the user to a server via the network of the internet service provider,
that a check is made, in particular by the server, as to which internet service provider is assigned the terminal sending the request, and
that in step c), depending on the internet service provider, a response containing a program logic executable on the terminal is communicated to the terminal.

In order to achieve a configuration of a further server that is different than the internet service provider, provision can be made for the customer database to be assigned to a further server, which accesses the customer database, wherein the further server subsequently processes data relating to the user according to different criteria in accordance with the modified configuration database.

In order to avoid a situation in which the server itself has to determine the internet service provider on the basis of the user's request, it can be provided that in order to carry out step c)

a first response is communicated from the server to the terminal of the user, wherein the first response contains a further program logic, which causes the terminal to execute a further request to a switching server,
the terminal, after receiving the first response, in accordance with the further program logic, executes a further request to the switching server,
when the further request arrives, the switching server, in particular, checks via which internet service provider it was contacted by the terminal, and
the switching server, in particular depending on the internet service provider of the terminal, communicates the further response to the terminal, wherein the response contains the program logic executable on the terminal.

A simple determination of the internet service provider provides that the internet service provider is determined on the basis of the circumstance that an identifier of the terminal, in particular the IP address, telephone number or SIM card number thereof, is within a predefined range or satisfies predefined criteria, or
that requests of the terminal, in particular to the web server via the network of the internet service provider, in the context of the communication via the network, are provided with an identifier that indicates or is assigned to the internet service provider, and that the internet service provider is determined on the basis of this identifier.

In order to avoid a situation in which the terminal or the server has to determine the internet service provider on the basis of the user's request, it can be provided that the user and/or the terminal communicate(s) the configuration message to a relay server, which determines the address of the configuration server of the internet service provider and which relays the configuration message to the configuration server, in particular on the basis of data determined in the configuration message, or on the basis of the circumstance that a used identifier of the terminal in particular the IP address, telephone number or SIM card number thereof, is within a predefined range or satisfies predefined criteria.

In order to achieve the effect that a configuration can be carried out even if the terminal is connected to the internet via an alternative internet service provider, it can be provided that the user while he/she is logged on by his/her terminal in the network of the internet service provider and is connected by his/her terminal to the internet via said network, steps b) to d) are carried out, but the program sequence for the time being is not executed on the terminal, and
local identification data for identifying the user and, if appropriate, the internet service provider are thereupon stored on the terminal, and if the user is connected by his/her terminal to the internet via an alternative internet service provider, steps b) to g) are carried out, wherein use is made of the local identification data for identifying the user and, if appropriate, the internet service provider.

For the same purpose it can be provided that a configuration is carried out in accordance with steps b) to e) with an alternative internet service provider, and identification identifiers assigned to one another are thereupon stored on the terminal and also on an assignment server,
steps b) to g) are subsequently carried out if the terminal is connected to the internet via the network of the internet service provider, wherein
in step d) the program logic causes the initiation of the program sequence independently of a user interaction,
in step e) the program sequence is executed independently of a user interaction, wherein a check is made to establish whether an identification identifiers stored on the assignment server is assigned to an identifier stored on the terminal and only in this case is the configuration message relayed to the configuration server of the internet service provider.

Programs for carrying out a method according to the invention on the server, the configuration server, the switching server or the relay server can advantageously be stored on a data carrier.

The invention achieves the object in the case of an arrangement of the type mentioned in the introduction by means of the following features.

In order to avoid a situation in which the server itself has to determine the internet service provider on the basis of the user's request, it can be provided that the internet service provider enables access to the internet for the user via a terminal, wherein the internet service provider is assigned an identification server, which, for each access of a user, in particular for each terminal assigned to a user, keeps available identity data, i) wherein the internet service provider is designed to communicate requests from the user to a server,
ii) wherein the server is designed, when a request arrives, to communicate a first response to the user, said first response containing a on a terminal of the user a further program logic and also an executable program sequence, which causes the terminal to execute a further request to a switching server, wherein the terminal is designed, after receiving the first response, in accordance with the further program logic, to execute a further request to the switching server, wherein the switching server, in particular, is designed, when the further request arrives, to check via which internet service provider it was contacted by the terminal, and wherein the switching server is designed, in particular depending on the internet service provider of the terminal, to communicate the further response to the terminal when the response contains the program logic executable on the terminal, iii) wherein the terminal is designed, upon receiving the response, to make possible for the user, in accordance with the program logic, the performance of a user interaction for controlling or suppressing the initiation of the program sequence, iv) wherein the terminal is designed to execute the program sequence contained in the program logic and to cause the terminal to communicate, if necessary indirectly, a configuration message to the configuration server of the internet service provider, v) the configuration server is designed, after this configuration message has arrived, to determine the identity assigned to the user, and vi) the configuration server is designed to modify a configuration database of the internet service provider, on the basis of the ascertained identity in accordance with the program sequence, in such a way that the internet service provider subsequently processes data relating to the user according to different criteria in accordance with the modified configuration database.

Particularly advantageous configurations can be carried out by virtue of the fact that the configuration database defines for the user in accordance with the latter's identity how or according to what criteria the internet service provider is intended to process further requests of the relevant user via the network, and/or in what way the internet service provider delivers notifications or bills to the user, in particular in the form of letters or emails, and/or whether the internet service provider is intended to store data relating to the user with reference to the ascertained identity of the user or to keep said data available to a logging server for retrieval.

One advantageous implementation of a configuration database of the internet service provider provides for the configuration server to be designed, for the purpose of modifying the configuration database to modify, to erase or to mark data sets having the identity of the user or terminal, or to add a further feature to or link a further feature with the identity of the terminal or of the user that is kept available in the configuration database.

One advantageous procedure for the user-controlled initiation of the configuration provides for the terminal to be designed, upon receiving the response, in accordance with the program logic, to make possible the performance of a user interaction, in particular to indicate an actuation field, and, upon the performance of a user interaction on the actuation field by the user, to execute the program sequence contained in the program logic, said program sequence causing the terminal to communicate, if necessary indirectly, the configuration message to the identification server.

One simple variant of the invention, in which the address of the configuration server can be configured at the server, provides for the terminal to be designed to communicate a request from the user to the server via the network of the internet service provider, wherein the server is designed to check which internet server provider is assigned the terminal sending the request, and wherein the server is designed, depending on the internet service provider, to communicate to the terminal a response containing a program logic executable on the terminal.

In order to achieve a configuration of a further server that is different than the internet service provider, it can be provided that the customer database is assigned to a further server, which accesses the customer database, wherein the further server is designed to subsequently process data relating to the user according to different criteria in accordance with the modified configuration database.

In order to achieve the effect that a configuration can be carried out even if the terminal is connected to the internet via an alternative internet service provider, provision can be made as follows:

i) comprising an assignment server designed in the event of an assignment request, to output an identifier to a terminal and to store an identifier assigned to said identifier and at a later point in time on account of a checking request, on account of an identifier that has already been output being communicated back, to ascertain whether an identifier corresponding to said identifier is present having been stored in the assignment server, ii) wherein the terminal is designed, with an alternative internet service provider, to carry out a configuration via the server and subsequently to instigate a request to the assignment server, by means of which the latter outputs an identifier to the terminal, iii) wherein the terminal is designed to store said identifier as a local identifier, iv) wherein the terminal is designed, if it is connected to the internet via the network of the internet service provider at a later point in time, to check whether a local identifier is stored in said terminal, if this is the case, to communicate to the assignment server a checking request, which ascertains whether the terminal has already effected an assignment request to the assignment server, and if this is the case as well, to instigate the program sequence independently of a user interaction and to relay the configuration message to the configuration server of the internet service provider.

For the same purpose, it can be provided that the terminal is designed to store local identification data for identifying the user and, if appropriate, the internet service provider if the user does not instigate or refuses the execution of the program sequence, wherein the terminal is designed to contact the server by means of an alternative internet service provider using the local identification data, and wherein the server, the connection server and/or the relay server or are/is designed to identify the identity underlying the configuration on the basis of the local identification data.

A simple determination of the internet service provider provides that the server, the connection server or the terminal is designed to determine the internet service provider on the basis of the circumstance that an identifier of the terminal, in particular the IP address, telephone number or SIM card number thereof, is within a predefined range or satisfies predefined criteria, or that the server or the connection server is designed to determine requests of the terminal, in particular to the web server, which, in the context of the communication by the network, have been provided with an identifier that indicates or is assigned to the internet service provider, on the basis of said identifier.

In order to avoid the situation in which the terminal or the server has to determine the internet service provider on the basis of the user's request, it can be provided that a relay server is provided, which is designed
- to receive configuration messages from users or terminals,
- to determine the relevant configuration server on the basis of the configuration message, in particular
    - on the basis of data determined in the configuration message, or
    - on the basis of the circumstance that a used identifier of the terminal, in particular the IP address, telephone number or SIM card number thereof, is within a predefined range or satisfies predefined criteria,
- and to relay the configuration messages received from the user and/or from the terminal to the to the configuration server.

BRIEF DESCRIPTION OF THE SEVERAL VIEWS OF THE DRAWING

Some particular embodiments of the invention are illustrated in greater detail in the figures of the drawing.

FIG. 2 shows a first embodiment of the invention, by means of which a configuration of the behaviour of the internet service provider is carried out.

FIG. 3 shows an alternative second embodiment of the invention, wherein the concrete configuration is carried out by means of a further server.

DESCRIPTION OF THE INVENTION

Figure 1:
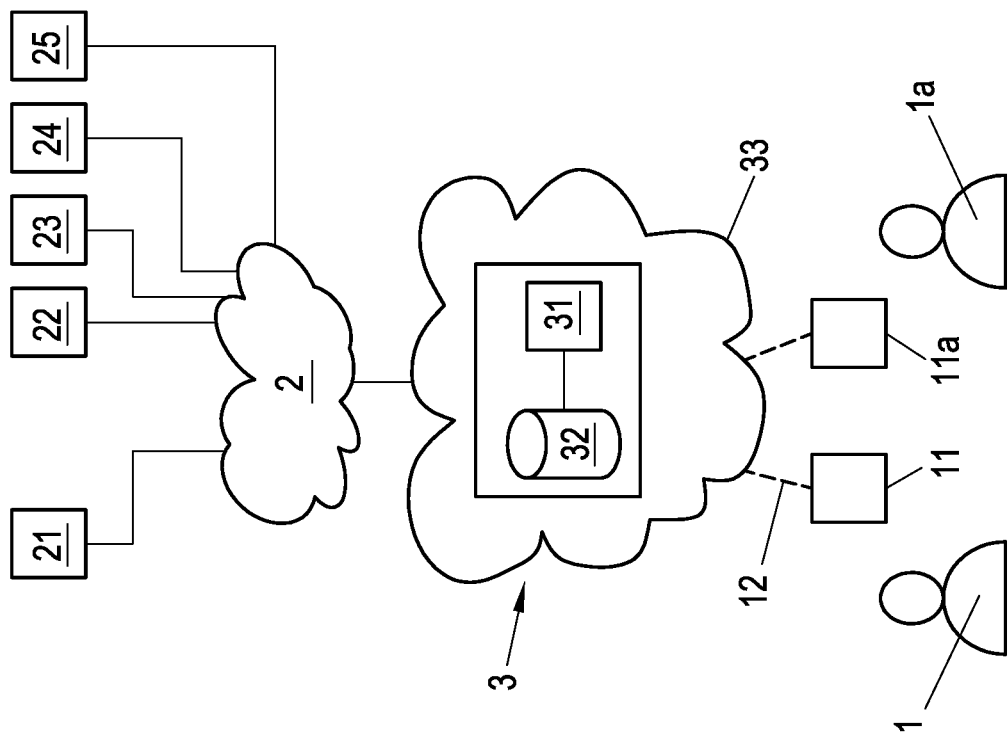
FIG. 1 shows the typical function of the communication of terminals with a web server via an internet service provider.

FIG. 1 illustrates a user 1 who is connected to the internet 2 via a mobile terminal 11 assigned to him/her, in particular a cellular phone. An internet service provider 3 mediates the access to the internet 2 for the user 1. Said internet service provider has a network 33, a mobile radio network in the present exemplary embodiment, wherein a separate access 12 to the internet service provider 3 via the mobile radio network 33 is set up for the cellular phone 11 assigned to the user 1. The internet service provider 3 is connected to the internet 2 in terms of data and in this way enables communication connections to be established between the terminal 11 of the user 1 and servers 21-25 or computers connected to the internet 2.

The internet service provider 3 furthermore has a configuration server 31, which manages individual identities ID or identity data assigned to the users 1, 1a. The configuration server 31 is connected to a configuration database 32 in terms of data, which configuration database stores configuration settings for each individual user 1 of the internet service provider 3 depending on the latter's contractual conditions and on modifications that will be explained later. The individual configuration data stored in the configuration database 32 can be modified separately for each user 1, wherein, for identifying the configuration data of individual users 1, the identity ID of the user 1 is indicated by identity data.

As a result of the configuration stored in the configuration database 32, it is possible for different items of configuration information to be stored and for settings to be changed in this way:

For each user 1 it is possible to store separately how requests of the relevant user 1 are processed via the network 33 of the internet service provider 3. In this context, individual requests can be relayed via different communication channels or the data rate can be set.

Furthermore, in the configuration data it is possible to store in what way notifications or bills are delivered to the user 1, in particular in the form of letters or emails. In this regard, there is the possibility, for example, for the internet service provider 3 to have two separate delivery services, namely firstly an email delivery service in the form of an outgoing email server, which delivers invoices to the users via email; secondly, notifications or invoices on the part of the internet service provider can also be delivered via automated postal dispatch to those users 1 who have chosen this type of delivery. Moreover, automotive delivery options also exist, which can likewise be chosen separately by each user 1, wherein the selection of the type of delivery can be stored in the configuration database.

Furthermore, there is also the possibility of defining, on the basis of various data use declarations and data use releases, whether data relating to the user 1 will be stored from then on and/or that such data of the user 1 are kept available to a logging server 25 for retrieval.

The configuration database 32 can be realized in various ways. There is the possibility of the configuration database 32 containing a series of data sets, wherein each data set is respectively assigned to an identity ID of a user 1 or of a terminal 11. Furthermore, there is also the possibility, of course, of further tables being provided in the configuration database 32 and additional entries being stored in tables, which are linked with the identity ID of the terminal 11 or of the user 1.

In many applications, the configuration database 32 is assigned to the internet service provider 3. Such an assignment is not mandatory, however; rather, the configuration database 32 of a further server 26 (FIG. 3) can also be modified by the method according to the invention. For this purpose, the further server 26 allows the configuration server 31 to have the requisite data access to the relevant configuration database 32. After the modification of the configuration database 32, the behavior of the further server 26 changes in relation to the relevant user 1, wherein the configuration information mentioned above can also be implemented by the further server 26 depending on the type of service offered by the further server 26.

FIG. 2 schematically illustrates a first embodiment of an arrangement according to the invention or respectively of a method according to the invention for configuring the behavior of an internet service provider 3, wherein, in particular, the concrete sequence of the successively performed transmissions or respectively interactions between the individual communication partners is illustrated in greater detail.

In a step b), the user 1 or the latter's terminal 11 communicates a request R to a server 21. This can be carried out via the network 33 for instance via the internet access made available by the internet service provider 3.

In a step c), the server 21 communicates a response S to the user 1. Said response S comprises a program logic L executable or interpretable on a terminal 11 of the user 1, and a program sequence P executable on the terminal 11. In the present exemplary embodiment, the program logic L is an HTML or XML code, for example, which contains firstly a text, which makes the user 1 aware of the specific circumstances of the configuration, and secondly an actuation field, for example button, which is assigned a function implemented in JavaScript as program sequence P, which is initiated when the button is pressed. A web browser is preferably implemented in the terminal 11 for the purpose of interpreting said program logic L, said web browser being able to indicate the HTML code and ascertain whether the actuation field was actuated by the user 1. If this is the case, the relevant program sequence P assigned to the program logic L is executed by the web browser.

If the terminal 11 then receives a response S, it makes a corresponding indication available to the user 1 in accordance with the program logic L in a step d), wherein an actuation field in the form of a button that can be pressed or actuated by the user 1 is also represented. If the user 1 presses on the actuation field, then the relevant program sequence P for changing the configuration is initiated and executed on the terminal 11.

Alternatively, however, it is also possible for the user interaction to consist in the fact that the user 1 continues to use a web page offered by the server 21 or clicks on links from said web page or activates, uses or deactivates parts of the web page.

Furthermore, it is also possible to use any action that is otherwise ascertainable by the terminal 11, for example mechanical movement, movement to a location on the Earth's surface, acoustically perceptible signals, etc., as user interaction.

As an alternative to the concrete representation of a button, in the third step d) for initiating the program sequence P, provision can also be made for an actuation field to be made available, by means of which the initiation of the program sequence P is prevented or stopped. In this case, the program logic L can additionally contain a timer, wherein the program sequence P is initiated if the user 1 or the latter's terminal 11 does not bring about revocation by actuating the button within a predefined time period after receiving the response S. For this purpose, the response S contains a program logic L that makes possible the performance of a user interaction in order to prevent the initiation of the program sequence P. In this alternative, too, the terminal 11, upon receiving the response S, in accordance with the program logic L, makes possible the performance of a user interaction in order to control the initiation of the program sequence P makes possible.

Instead of visual actuation fields which are indicated on a display and which can be actuated by tapping, clicking or pressing of keys, an actuation can also be ascertained acoustically by means of a microphone or optically by means of a camera.

In a step e), on account of an act of operational control or the omission of such an act by the user 1, the program sequence P contained in the program logic L is executed. In executing this program sequence P, the terminal 1 communicates a configuration message K, which for configuration to the configuration server 31 of the internet service provider 3. The communication can be effected from the terminal 11 directly to the configuration server 31, although it should be taken into consideration that in this case the terminal 11 must have knowledge about the address, in particular the IP address, at which the configuration server 31 is to be addressed.

For this purpose, the address of the configuration server 31 can either be stored directly in the mobile terminal 11 or else be transmitted from the server 21 to the mobile terminal 11. In this case, the server 21 identifies the internet service provider 3 of the mobile terminal 11 itself, for example on the basis of the IP address, telephone number or SIM card number of the mobile terminal 11 or on the basis of specific header data contained in the request R and in its response S sends to the user 1 or the mobile terminal 11 a program sequence P which is specifically adapted to the internet service provider 3 and which is able, in particular, to identify and to address the configuration server 31 of the internet service provider 3.

But in the case of the first embodiment and in the case of the second embodiment yet to be explained (FIG. 3) of the invention, there is the possibility of the mobile terminal 11 having knowledge of the address of the configuration server 31 and transmitting the configuration message K directly to the configuration server 31.

As an alternative thereto, in both embodiments, there is also the possibility of the terminal 11 not having knowledge of the current address of the configuration server 31, but rather communicating the configuration message K to the configuration server 31 by means of the switching of a relay server 24. In this respect, there is also the possibility that, in the case of the communication sequences illustrated in FIGS. 2 and 3, neither the server 21 nor the switching server 22 nor the terminal 11 need to have knowledge of the address of the configuration server 31 of the internet service provider 3. Rather, the terminal 11 or the user 1 sends the configuration message K to a relay server 24. Just said relay server 24 identifies the association of the terminal 11 of the user 1 with an internet service provider 3 and relays the configuration message K to the configuration server 31 of that internet service provider 3 via which the mobile terminal 11 or the user 1 has access to the internet 2. The relay server 24 can determine the internet service provider 3 once again on the basis of the IP address, telephone number or SIM card number of the mobile terminal 11 or on the basis of header data which it receives in the configuration message K of the terminal 11.

After this configuration message K has arrived, the configuration server 31 determines the identity ID assigned to the user 1 in a step f). This is carried out either on the basis of the configuration message K, the IP address, telephone number or SIM card number allocated to the user 1, or on the basis of header data in the data sent by the terminal 11, or on the basis of connection data available to the internet service provider 3 on the basis of the circumstance that the terminal 11 is connected to and communicates with the network 33 of the internet service provider 3.

In a configuration step g), the configuration database (32) of the internet service provider (3), on the basis of the ascertained identity (ID), in accordance with the program sequence (P) is modified in such a way that the internet service provider (3) subsequently processes data relating to the user (1) according to different criteria in accordance with the modified configuration database (32). The concrete configurations which are carried out in this context have already been explained in the introduction, and so at this juncture reference should be made to the configurations mentioned above.

In the second embodiment of the invention as illustrated in FIG. 3, what is achieved is that the server 21 need not have knowledge of the address of the configuration server 31 in step c). This has the advantage, in particular, that a multiplicity of servers 21 can be used, none of which needs to know the address of the configuration server 31, as a result of which a change in the address of the configuration server 31 does not necessitate changes at the servers 21.

The user 1 or the terminal 11 communicates a request R to the server 21. The server 21 communicates a first response U to the terminal 11 of the user 1. Said first response U contains a further program logic M, which, if it is executed on the terminal 11, causes said terminal 11 to execute a further request T to a switching server 22. The further program logic L, as also in the case of the first embodiment, can be an HTML or XML code that is assigned a JavaScript executable on the terminal 11 as program sequence P.

After receiving said first response U, the terminal 11, in accordance with the program logic L or the program sequence P contained in the program logic L, carries out a further request T, which is communicated to the switching server 22. The switching server 22 is able to identify via which internet service provider 3 it was contacted by the terminal 11. This identification can be carried out analogously to the previous exemplary embodiment, for example on the basis of the IP address, telephone number or SIM card number of the terminal 11 or on the basis of header data contained in the further request T of the mobile terminal 11 at the second server 22.

Depending on the internet service provider 3 of the terminal 11, the switching server 22 sends the further response S to the terminal 11. The response S contains a program logic L interpretable by the terminal 11. As also in the first exemplary embodiment, the program logic L contains an executable program sequence P, wherein the terminal 11, upon receiving the response S, in accordance with the program logic L, makes possible the performance of a user interaction for controlling the initiation of the program sequence P. As also in the case of the first embodiment of the invention, this can be carried out by the user 1 effecting an actuation of an actuation field that either initiates or prevents the execution of the program sequence P.

The configuration message K further contains an identity ID which is assigned to the user 1 or to the mobile terminal 11 and which can be used to carry out a configuration at the configuration database 32 with respect to the user 1 or the terminal 11. The configuration action that is to be specifically carried out with respect to the identity can be predefined at various points and is at least implicitly contained in the configuration message K.

One particularly preferred development of the invention provides for the request R communicated from the server 21 to the terminal 11 of the user 1 to contain a program logic L that is interpreted by the mobile terminal 11 to the effect that it indicates a data use declaration to the user 1. Furthermore, the program logic L contains an actuation field, by means of which the user 1 confirms on the mobile terminal 11 that he/she grants a data use release. Upon execution of the program sequence P after actuation of the actuation field by the user 1, a configuration message K in this regard is created, which contains both the circumstance of the data use release, at least implicitly, and an identifier identifying the terminal 11 and/or the user 1. If the configuration message K arrives at the configuration server 31, then the latter modifies the configuration database 32 and preferably includes it in the respective user data set with the identity ID of the user 1. Subsequently, the internet service provider 3 stores data relating to the user 1, for example location data, use data and similar data with reference to the user 1. The internet service provider 3 keeps the relevant data available for the logging server 25 for retrieval.

Figure 4:
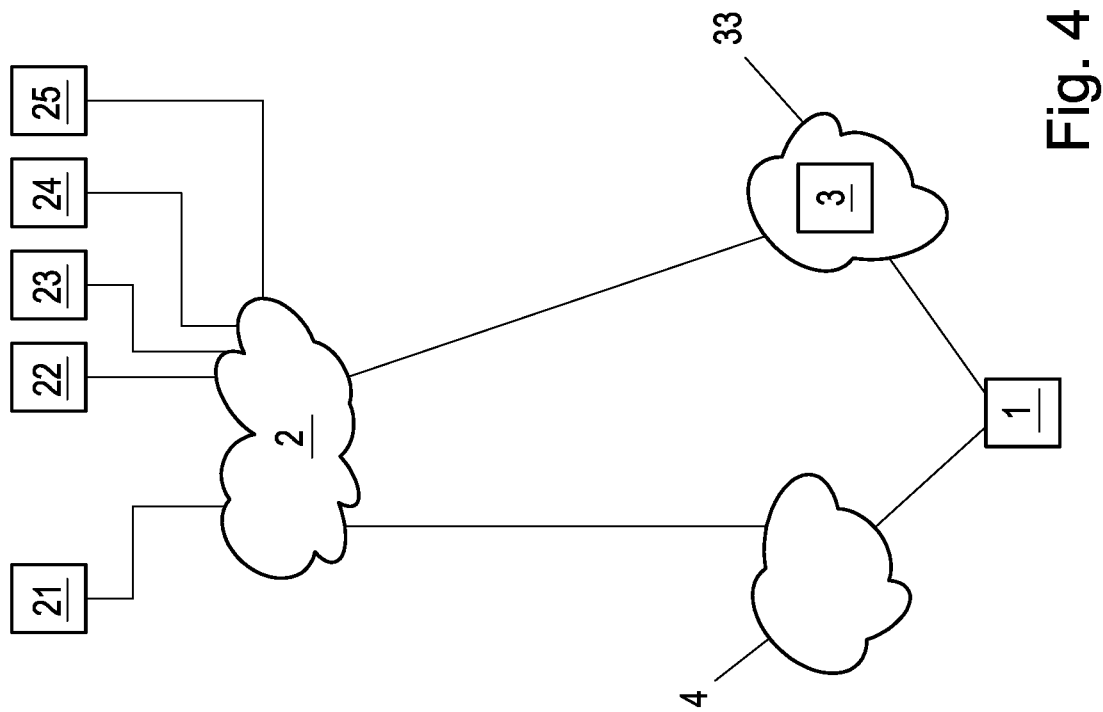
FIG. 4 shows an arrangement that can be used to implement additional functions concerning the procedure according to the invention, wherein the terminal of the user can in some instances also be connected to the internet via an alternative internet service provider.

FIG. 4 illustrates an arrangement comprising a terminal 11 and two different internet service providers 3, 4, on the basis of which two additional functions —also usable in combination—are illustrated in greater detail. These additional functions make it possible, in various scenarios, to carry out a configuration action by means of the terminal 11 of the user 1 even if the latter is connected to the internet 2 via an alternative internet service provider 4 at times. The additional functions illustrated here are combinable with all embodiments of the invention as illustrated above.

Such a connection to an alternative internet service provider 4 can be established, for example, if a mobile terminal 11 is not connected to the internet 2 via the network 33 of the mobile radio operator 3 but rather via a WLAN of an alternative internet service provider 4.

In the first application, the user 1 firstly logged on using a terminal 11 in the network 33 of the internet service provider 3 and is connected to the internet 2 via said network 33 using the terminal 11. The user 1 communicates a request R to the server 21 and receives a response containing a program logic L interpretable on the terminal 11 of the user 1 and also an executable program sequence R. The terminal 11, upon receiving the response S, in accordance with the program logic L, makes possible the performance of a user interaction for controlling the initiation of the program sequence P. Unlike in the previous exemplary embodiments, however, the user 1 does not initiate the program sequence R. The terminal 11 thereupon locally stores local identification data for identifying the user 1.

Without consent or upon refusal by the user 1, however, no configuration data at all are changed in the configuration database 32, nor is any configuration message K sent to the configuration server 31. The storage of the local identification data for identifying the user 1 and, if appropriate, the internet service provider 3 ensures that a later configuration proceeding from the terminal 11 is possible even if the terminal 11 is connected to the internet 2 in an alternative way.

If the terminal 11 or the user 1 then logs on via an alternative internet service provider 4, for example via a WLAN hotspot, all of steps b) to g) of the previous embodiments can be carried out even if the user 1 or the latter's terminal 11 is not connected to the internet 2 via the network 33 of the internet service provider 3, rather the user 1 chooses an alternative internet service provider 4. During the identification of the user 1 and of the internet service provider 3, instead of the identification data that are determinable in the context of the connection, use is made of the local identification data stored in the terminal 11 for identifying the user 1 and also the internet service provider 3. The configuration can thus also be carried out on the basis of the stored identification data, without switching by means of the internet service provider 3 being required for the communication of the configuration message K.

The second additional function of the arrangement provides for the configuration action to be carried out by the terminal 11 while the latter is connected to the internet 2 via an alternative internet service provider 4. After the initiation of the program sequence P, however, in this application, the internet service provider 3 cannot be ascertained for the relevant terminal 11. For this reason, identification identifiers assigned to one another are stored on the terminal 11 and also on an assignment server 23 in order, for the case where the terminal 11, if it via the network 33 of the internet service provider 3, makes contact once again with the server 21, to enable an identification of the internet service provider 3 of the terminal 11 and accordingly to be able to carry out the configuration.

If the terminal 11 is subsequently connected to the internet 2 via the network 33 of the internet service provider 3, then a configuration action of the user 1 is already present, which need not be carried out again. The program logic L causes the immediate initiation of the program sequence P independently of a user interaction.

In order to ascertain that a user interaction was actually present during a previous connection, a check is made to establish whether an identification identifier stored on the assignment server 23 is assigned to an identification identifier stored on the terminal 11. The terminal 11 sends a configuration message K to the configuration server 31 of the internet service provider 3 only if identification identifiers assigned to one another are present in the terminal 11 and in the assignment server 23.

In the present exemplary embodiment, the ascertainment of the internet service provider 3 or the configuration server to which the configuration message K is intended to be relayed can also be carried out by a relay server 24 present, if necessary.

REFERENCE SIGNS 1. user
11. terminal
12. access
2. internet
21. server
22. switching server
23. assignment server
24. relay server
25. logging server
26. further server
3. internet service provider
31. configuration server
32. configuration database
33. network
4. alternative internet service provider
ID. Identity
K. configuration message
L. program logic
M. further program logic
P. program sequence
R. request
S. response
T. further request
U. first response

The invention claimed is:

1. A method for configuring an internet service provider or a further server, the method comprising the following steps:
   a) using the internet service provider to make an access to the internet available to a user over a network by assigning to the internet service provider an identification server keeping data available for identifying an identity of the user for an access made available to at least one of the user or a terminal assigned to the user;
   b) communicating a request from the user to a server;
   c) communicating a response to the user, the response containing a program logic interpretable by the terminal of the user as well as an executable program sequence;
   d) using the terminal, upon receiving the response, in accordance with the program logic, to make possible a performance of a user interaction for controlling or suppressing an initiation of the program sequence;
   e) executing the program sequence contained in the program logic after the initiation in step d), and using the program sequence to cause the terminal to communicate, if necessary indirectly, a configuration message to the configuration server of the internet service provider;
   f) after arrival of the configuration message, using the configuration server to determine or ascertain the identity assigned to the user;
   g) modifying a configuration database of the internet service provider or of a further server cooperating with the internet service provider based on the ascertained identity in accordance with the program sequence to cause the internet service provider or the further server to subsequently process data relating to the user according to different criteria in accordance with the modified configuration database;
   the user while being logged on the user's terminal in the network of the internet service provider and connected by the user's terminal to the internet over the network:
      carries out steps b) to d), but the program sequence for the time being is not executed on the terminal, and thereupon uses the terminal to store local identification data for identifying the user and, if appropriate, the internet service provider; and
   if the user is connected by the user's terminal to the internet over an alternative internet service provider:
      carries out steps b) to g) by using the local identification data for identifying the user and, if appropriate, the internet service provider.

2. The method according to claim 1, which further comprises using the configuration stored in the configuration database for the user in accordance with the user's identity to define at least one of:
   how or according to what criteria further requests of a relevant user are processed over the network of the internet service provider, or
   in what way or as letters or emails notifications or bills are delivered to the user, or
   whether data relating to the user are at least one of stored or are kept available to a logging server for retrieval.

3. The method according to claim 1, which further comprises, during the modification of the configuration database in step g):
   modifying, erasing or marking data sets having the identity of the user or terminal, or
   adding a further feature to or linking a further feature with the identity of the terminal or of the user being kept available in the configuration database.

4. The method according to claim 1, which further comprises:
   in step d) using the terminal, upon receiving the response, in accordance with the program logic, to make possible a performance of a user interaction or to indicate an actuation field, and
   in step e) performing the user interaction or actuating the actuation field, and thereupon executing a program sequence contained in the program logic causing the terminal to communicate, if necessary indirectly, the configuration message to the identification server.

5. The method according to claim 1, which further comprises:
in step b) communicating the request from the user to a server over the network of the internet service provider, carrying out a check, optionally by the server, as to which internet service provider is assigned the terminal sending the request, and
in step c), depending on the internet service provider, communicating a response containing a program logic executable on the terminal to the terminal.

6. The method according to claim 1, which further comprises assigning a customer database to a further server accessing the customer database, and using the further server to subsequently process data relating to the user according to different criteria in accordance with the modified configuration database.

7. The method according to claim 1, which further comprises carrying out step c) by:
communicating a first response from the server to the terminal of the user, the first response containing a further program logic causing the terminal to execute a further request to a switching server,
using the terminal, after receiving the first response, in accordance with the further program logic, to execute a further request to the switching server,
when the further request arrives, using the switching server to check over which internet service provider it was contacted by the terminal, and
using the switching server, optionally depending on the internet service provider of the terminal, to communicate the further response to the terminal, the response containing the program logic executable on the terminal.

8. The method according to claim 1, which further comprises:
determining the internet service provider based on a circumstance that an identifier of the terminal, or an IP address, telephone number or SIM card number thereof, is within a predefined range or satisfies predefined criteria, or
providing requests of the terminal, or to the web server over the network of the internet service provider, in a context of communication over the network, with an identifier indicating or being assigned to the internet service provider, and determining the internet service provider based on the identifier.

9. The method according to claim 1, wherein at least one of the user or the terminal communicates the configuration message to a relay server determining the address of the configuration server of the internet service provider and relaying the configuration message to the configuration server:
based on data determined in the configuration message, or
based on a circumstance that a used identifier of the terminal, or the IP address, telephone number or SIM card number thereof, is within a predefined range or satisfies predefined criteria.

10. A method for configuring an internet service provider or a further server, the method comprising the following steps:
a) using the internet service provider to make an access to the internet available to a user over a network by assigning to the internet service provider an identification server keeping data available for identifying an identity of the user for an access made available to at least one of the user or a terminal assigned to the user;
b) communicating a request from the user to a server;
c) communicating a response to the user, the response containing a program logic interpretable by the terminal of the user as well as an executable program sequence;
d) using the terminal, upon receiving the response, in accordance with the program logic, to make possible a performance of a user interaction for controlling or suppressing an initiation of the program sequence;
e) executing the program sequence contained in the program logic after the initiation in step d), and using the program sequence to cause the terminal to communicate, if necessary indirectly, a configuration message to the configuration server of the internet service provider;
f) after arrival of the configuration message, using the configuration server to determine or ascertain the identity assigned to the user;
g) modifying a configuration database of the internet service provider or of a further server cooperating with the internet service provider based on the ascertained identity in accordance with the program sequence to cause the internet service provider or the further server to subsequently process data relating to the user according to different criteria in accordance with the modified configuration database:
carrying out a configuration in accordance with steps b) to e) with an alternative internet service provider, and thereupon storing identification identifiers assigned to one another on the terminal as well as on an assignment server,
subsequently carrying out steps b) to g) if the terminal is connected to the internet over the network of the internet service provider,
in step d) using the program logic to cause an initiation of the program sequence independently of a user interaction, and
in step e) executing the program sequence independently of a user interaction, and checking to establish whether an identification identifier stored on the assignment server is assigned to an identifier stored on the terminal and only then relaying the configuration message to the configuration server of the internet service provider.

11. A non-transitory computer-readable medium with instructions stored thereon that when executed by a server, a switching server, an assignment server, a relay server or a logging server performs the steps according to claim 1.

12. An arrangement for configuring the behavior of an internet service provider or a further server during or not during communication of a user with the internet, the arrangement comprising:
a terminal and an internet service provider enabling access to the internet for the user through said terminal, said internet service provider being assigned an identification server keeping identity data available for each access of a user or for each terminal assigned to a user;
i) a server receiving requests communicated by said internet service provider from the user;
ii) said server being configured, upon arrival of a request, to communicate a response to the user, said response containing a program logic executable on said terminal of the user as well as an executable program sequence;
iii) said terminal being configured, upon receiving said response, to permit a performance of a user interaction for the user for controlling or suppressing an initiation of said program sequence in accordance with said program logic;
iv) said terminal being configured to execute said program sequence contained in said program logic and to cause said terminal to communicate, if necessary indirectly, a configuration message to said configuration server of said internet service provider;
v) said configuration server being configured, after arrival of said configuration message, to determine an identity assigned to the user;
vi) said internet service provider having a configuration database, said configuration server being configured to modify said configuration database or the further server based on said ascertained identity in accordance with said program sequence, to cause said internet service provider or the further server to subsequently process data relating to the user according to different criteria in accordance with said modified configuration database; and
i) an assignment server configured:
to output said identifier to said terminal and to store said identifier assigned to said identifier in an event of an assignment request, and
to ascertain a presence of an identifier corresponding to said identifier having been stored in said assignment server at a later point in time due to a checking request and due to an identifier having already been output being communicated back,
ii) said terminal being configured, with an alternative internet service provider, to carry out a configuration through said server and to subsequently instigate a request to said assignment server being used by said assignment server to output said identifier to said terminal,
iii) said terminal being configured to store said identifier as a local identifier,
iv) said terminal being configured, when connected to the internet over said network of said internet service provider at a later point in time:
to check whether a local identifier is stored in said terminal,
if said local identifier is stored in said terminal, to communicate to said assignment server a checking request ascertaining whether said terminal has already effected an assignment request to said assignment server, and
if said local identifier is stored in said terminal, to instigate said program sequence independently of a user interaction and to relay said configuration message to said configuration server of said internet service provider.

13. The arrangement according to claim 12, wherein said configuration database defines for the user in accordance with the user's identity at least one of:
how or according to what criteria said internet service provider is intended to process further requests of a relevant user over said network, or
in what way said internet service provider delivers notifications or letters or emails or bills to the user, or
whether said internet service provider is intended to store data relating to the user with reference to said ascertained identity of the user or to keep said data available to a logging server for retrieval.

14. The arrangement according to claim 12, wherein said configuration server is configured, for modifying said configuration database:
to modify, to erase or to mark data sets having said identity of the user or said terminal, or
to add a further feature to or link a further feature with said identity of said terminal or of the user being kept available in said configuration database.

15. The arrangement according to claim 12, wherein said terminal is configured, upon receiving said response, in accordance with said program logic, to permit a performance of a user interaction or to indicate an actuation field and, upon said performance of said user interaction on said actuation field by the user, to execute said program sequence contained in said program logic, said program sequence causing said terminal to communicate, if necessary indirectly, said configuration message to said identification server.

16. The arrangement according to claim 12, wherein said terminal is configured to communicate the request from the user to said server over said network of said internet service provider, said server is configured to check which internet server provider is assigned said terminal sending said request, and said server is configured, depending on said internet service provider, to communicate to said terminal said response containing said program logic executable on said terminal.

17. The arrangement according to claim 12, wherein said customer database is assigned to a further server accessing said customer database, said further server being configured to subsequently process data relating to the user according to different criteria in accordance with said modified configuration database.

18. The arrangement according to claim 12, wherein:
said server, said connection server or said terminal is configured to determine said internet service provider based on a circumstance of said identifier of said terminal or an IP address, telephone number or SIM card number thereof being within a predefined range or satisfying predefined criteria, or
said server or said connection server is configured to determine requests of said terminal or said web server having been provided with an identifier indicating or being assigned to said internet service provider based on said identifier in a context of a communication by said network.

19. The arrangement according to claim 12, which further comprises a relay server configured:
to receive said configuration messages from users or said terminals,
to determine said relevant configuration server based on said configuration message,
based on data determined in said configuration message, or
based on a circumstance of a used identifier of said terminal or an IP address, telephone number or SIM card number thereof being within a predefined range or satisfying predefined criteria, and
to relay said configuration messages received from at least one of the user or said terminal to said configuration server.

20. An arrangement for configuring the behavior of an internet service provider or a further server during or not during communication of a user with the internet, the arrangement comprising:
a terminal and an internet service provider enabling access to the internet for the user through said terminal, said internet service provider being assigned an identification server keeping identity data available for each access of a user or for each terminal assigned to a user;

19 i) a server receiving requests communicated by said internet service provider from the user;
ii) said server being configured, upon arrival of a request, to communicate a response to the user, said response containing a program logic executable on said terminal of the user as well as an executable program sequence;
iii) said terminal being configured, upon receiving said response, to permit a performance of a user interaction for the user for controlling or suppressing an initiation of said program sequence in accordance with said program logic;
iv) said terminal being configured to execute said program sequence contained in said program logic and to cause said terminal to communicate, if necessary indirectly, a configuration message to said configuration server of said internet service provider;
v) said configuration server being configured, after arrival of said configuration message, to determine an identity assigned to the user;
vi) said internet service provider having a configuration database, said configuration server being configured to modify said configuration database or the further server based on said ascertained identity in accordance with said program sequence, to cause said internet service provider or the further server to subsequently process data relating to the user according to different criteria in accordance with said modified configuration database;
said terminal being configured to store local identification data for identifying the user and, if appropriate, to store said internet service provider if the user does not instigate or refuses an execution of said program sequence,
said terminal being configured to contact said server by using an alternative internet service provider using said local identification data, and
at least one of said server, said connection server or said relay server being configured to identify said identity underlying the configuration based on said local identification data.

21. An arrangement for configuring the behavior of an internet service provider or a further server during or not during communication of a user with the internet, the arrangement comprising:
a terminal and an internet service provider enabling access to the internet for the user through said terminal, said internet service provider being assigned an identification server keeping identity data available for each access of a user or for each terminal assigned to a user;
i) a server receiving requests communicated by said internet service provider from the user;
ii) a switching server, said server being configured, upon arrival of a request, to communicate a first response to the user, said first response containing a further program logic on said terminal of the user as well as an executable program sequence causing said terminal to execute a further request to said switching server;
said terminal being configured, after receiving said first response, to execute said further request to said switching server in accordance with said further program logic;
said switching server being optionally configured, upon arrival of said further request, to check through which internet service provider said switching server was contacted by said terminal;
said switching server being configured, optionally depending on said internet service provider of said terminal, to communicate said further response to said

20 terminal when said response contains said program logic executable on said terminal;
iii) said terminal being configured, upon receiving said response, to permit the user, in accordance with said program logic, to perform a user interaction for controlling or suppressing an initiation of said program sequence;
iv) said terminal being configured to execute said program sequence contained in said program logic and to cause said terminal to communicate, if necessary indirectly, a configuration message to said configuration server of said internet service provider;
v) said configuration server being configured, after arrival of said configuration message, to determine an identity assigned to the user;
vi) said internet service provider having a configuration database, said configuration server being configured to modify said configuration database based on an ascertained identity in accordance with said program sequence, to cause said internet service provider to subsequently process data relating to the user according to different criteria in accordance with said modified configuration database: and
i) an assignment server configured:
to output said identifier to said terminal and to store said identifier assigned to said identifier in an event of an assignment request, and
to ascertain a presence of an identifier corresponding to said identifier having been stored in said assignment server at a later point in time due to a checking request and due to an identifier having already been output being communicated back,
ii) said terminal being configured, with an alternative internet service provider, to carry out a configuration through said server and to subsequently instigate a request to said assignment server being used by said assignment server to output said identifier to said terminal,
iii) said terminal being configured to store said identifier as a local identifier,
iv) said terminal being configured, when connected to the internet over said network of said internet service provider at a later point in time:
to check whether a local identifier is stored in said terminal,
if said local identifier is stored in said terminal, to communicate to said assignment server a checking request ascertaining whether said terminal has already effected an assignment request to said assignment server, and
if said local identifier is stored in said terminal, to instigate said program sequence independently of a user interaction and to relay said configuration message to said configuration server of said internet service provider.

22. The arrangement according to claim 21, wherein said configuration database defines for the user in accordance with the user's identity at least one of:
how or according to what criteria said internet service provider is intended to process further requests of a relevant user over said network, or
in what way said internet service provider delivers notifications or letters or emails or bills to the user, or
whether said internet service provider is intended to store data relating to the user with reference to said ascertained identity of the user or to keep said data available to a logging server for retrieval.

23. The arrangement according to claim 21, wherein said configuration server is configured, for modifying said configuration database:
- to modify, to erase or to mark data sets having said identity of the user or said terminal, or
- to add a further feature to or link a further feature with said identity of said terminal or of the user being kept available in said configuration database.

24. The arrangement according to claim 21, wherein said terminal is configured, upon receiving said response, in accordance with said program logic, to permit a performance of a user interaction or to indicate an actuation field and, upon said performance of said user interaction on said actuation field by the user, to execute said program sequence contained in said program logic, said program sequence causing said terminal to communicate, if necessary indirectly, said configuration message to said identification server.

25. The arrangement according to claim 21, wherein said terminal is configured to communicate the request from the user said server over said network of said internet service provider, said server is configured to check which internet server provider is assigned said terminal sending said request, and said server is configured, depending on said internet service provider, to communicate to said terminal said response containing said program logic executable on said terminal.

26. The arrangement according to claim 21, wherein said customer database is assigned to a further server accessing said customer database, said further server being configured to subsequently process data relating to the user according to different criteria in accordance with said modified configuration database.

27. The arrangement according to claim 21, wherein:
- said server, said connection server or said terminal is configured to determine said internet service provider based on a circumstance of said identifier of said terminal or an IP address, telephone number or SIM card number thereof being within a predefined range or satisfying predefined criteria, or
- said server or said connection server is configured to determine requests of said terminal or said web server having been provided with an identifier indicating or being assigned to said internet service provider based on said identifier in a context of a communication by said network.

28. The arrangement according to claim 21, which further comprises a relay server configured:
- to receive said configuration messages from users or said terminals,
- to determine said relevant configuration server based on said configuration message,
    - based on data determined in said configuration message, or
    - based on a circumstance of a used identifier of said terminal or an IP address, telephone number or SIM card number thereof being within a predefined range or satisfying predefined criteria, and
- to relay said configuration messages received from at least one of the user or said terminal to said configuration server.

29. An arrangement for configuring the behavior of an internet service provider or a further server during or not during communication of a user with the internet, the arrangement comprising:
- a terminal and an internet service provider enabling access to the internet for the user through said terminal, said internet service provider being assigned an identification server keeping identity data available for each access of a user or for each terminal assigned to a user;
- i) a server receiving requests communicated by said internet service provider from the user;
- ii) a switching server, said server being configured, upon arrival of a request, to communicate a first response to the user, said first response containing a further program logic on said terminal of the user as well as an executable program sequence causing said terminal to execute a further request to said switching server;
- said terminal being configured, after receiving said first response, to execute said further request to said switching server in accordance with said further program logic;
- said switching server being optionally configured, upon arrival of said further request, to check through which internet service provider said switching server was contacted by said terminal;
- said switching server being configured, optionally depending on said internet service provider of said terminal, to communicate said further response to said terminal when said response contains said program logic executable on said terminal;
- iii) said terminal being configured, upon receiving said response, to permit the user, in accordance with said program logic, to perform a user interaction for controlling or suppressing an initiation of said program sequence;
- iv) said terminal being configured to execute said program sequence contained in said program logic and to cause said terminal to communicate, if necessary indirectly, a configuration message to said configuration server of said internet service provider;
- v) said configuration server being configured, after arrival of said configuration message, to determine an identity assigned to the user;
- vi) said internet service provider having a configuration database, said configuration server being configured to modify said configuration database based on an ascertained identity in accordance with said program sequence, to cause said internet service provider to subsequently process data relating to the user according to different criteria in accordance with said modified configuration database:
- said terminal being configured to store local identification data for identifying the user and, if appropriate, to store said internet service provider if the user does not instigate or refuses an execution of said program sequence,
- said terminal being configured to contact said server by using an alternative internet service provider using said local identification data, and
- at least one of said server, said connection server or said relay server being configured to identify said identity underlying the configuration based on said local identification data.

* * * * *